US012042730B2

United States Patent
Jin

(10) Patent No.: US 12,042,730 B2
(45) Date of Patent: Jul. 23, 2024

(54) PATHFINDING METHOD, DEVICE FOR A GAME OBJECT, AND COMPUTER-READABLE STORAGE MEDIUM

(71) Applicant: Shanghai Lilith Technology Corporation, Shanghai (CN)

(72) Inventor: Huan Jin, Shanghai (CN)

(73) Assignee: Shanghai Lilith Technology Corporation, Shanghai (CN)

( * ) Notice: Subject to any disclaimer, the term of this patent is extended or adjusted under 35 U.S.C. 154(b) by 260 days.

(21) Appl. No.: 17/774,788

(22) PCT Filed: May 26, 2021

(86) PCT No.: PCT/CN2021/096030
§ 371 (c)(1),
(2) Date: May 5, 2022

(87) PCT Pub. No.: WO2022/001511
PCT Pub. Date: Jan. 6, 2022

(65) Prior Publication Data
US 2022/0370909 A1    Nov. 24, 2022

(30) Foreign Application Priority Data
Jul. 3, 2020   (CN) .......................... 202010635530.9

(51) Int. Cl.
*A63F 13/56*   (2014.01)
(52) U.S. Cl.
CPC .................................. *A63F 13/56* (2014.09)

(58) Field of Classification Search
None
See application file for complete search history.

(56) References Cited

U.S. PATENT DOCUMENTS

| 10,828,568 | B2* | 11/2020 | Kurabayashi | A63F 13/35 |
| 11,511,191 | B2* | 11/2022 | Zhuang | A63F 13/573 |
| 2006/0135237 | A1* | 6/2006 | Tsuda | A63F 13/56 |
| | | | | 463/9 |
| 2020/0338450 | A1* | 10/2020 | Parr | A63F 13/35 |
| 2021/0316220 | A1* | 10/2021 | Parr | A63F 13/35 |

* cited by examiner

*Primary Examiner* — David L Lewis
*Assistant Examiner* — Matthew D Hoel
(74) *Attorney, Agent, or Firm* — David R. Stevens; Stevens Law Group

(57) ABSTRACT

A pathfinding method for a game object includes the following steps: the game object receives a movement request and sends a movement starting point and a movement ending point to a map server; the map server forms map information, and sends the map information to a pathfinding server, and the pathfinding server generates a movement path and sends the movement path to the map server; the map server determines whether there is an obstruction in the movement path; when there is no obstruction, the map server marks the movement path as valid and registers map units passed in the movement path; and when there is an obstruction, the map server sends a re-finding request to the pathfinding server, and the pathfinding server generates an updated path, until the map server determines that there is no obstruction in the updated path.

10 Claims, 2 Drawing Sheets

PATHFINDING METHOD, DEVICE FOR A GAME OBJECT, AND COMPUTER-READABLE STORAGE MEDIUM

TECHNICAL FIELD

The present disclosure relates to a field of game devices, and in particular to, a pathfinding method and device for a game object, and a computer-readable storage medium.

BACKGROUND

With continuous development of Internet technology, game industry is continuously developed, and game players pay particular attention to game AI in a game and performance of other players in the game. For example, in a SLG game, during a strategy layout process and a game process, game objects controlled by players and game objects that the game itself has (NPC) continue to move during the game process. Therefore, in the game, it is a common behavior for a game object to find a path from one location to another location.

During pathfinding, a case in which there is obstruction on the best path often occurs. Generally, there are two types of obstructions: static obstruction and dynamic obstruction. The static obstruction is an obstruction determined when a game map is generated, such as a terrain obstruction, a tree/house obstruction, etc. The dynamic obstruction is an obstruction that can change at any time, such as a dynamically changing obstruction of a game object controlled by the player during movement.

At present, the movement of the player unit in the game is mostly pathfinding and movement implemented by a client device. For the client-led movement, the dynamic obstruction is basically not considered, and a straight line from a starting point to an ending point is drawn (the unit movement is movement along a straight line on the map, regardless of whether the game object passes through the obstruction in the process of the movement). Even if the obstruction appears, clipping-through also occurs, and consequently game experience is affected.

In addition, movement pathfinding generally is implemented on a terminal. Although it is beneficial to disperse the overhead and pressure of pathfinding and reduce the load of the server, requirements for path optimization and the need to avoid the obstruction completely cannot be ensured.

Therefore, there is a need for a new pathfinding method for a game object to use high computing power of the server to compute the shortest movement path without obstruction.

SUMMARY

In order to overcome the technical defects, an object of the present disclosure is to provide a pathfinding method and device for a game object, and a computer-readable storage medium, to separate object movement calculation in a game from a map, introduce location prediction when dynamic obstruction of the map is considered, and reduce the probability of object movement collision and re-pathfinding.

The present disclosure discloses a pathfinding method for a game object, including the following steps:
receiving, by a game object, a movement request, and sending a movement starting point and a movement ending point of the game object to a map server;
packaging, by the map server, the received movement starting point and movement ending point, obstruction information, and registered path to form map information, and sending the map information to a pathfinding server;
generating, by the pathfinding server, a movement path according to the map information, and sending the movement path to the map server;
determining, by the map server, whether there is any static obstruction object and any future dynamic obstruction object in the movement path;
when there is no static obstruction object and future dynamic obstruction object, marking, by the map server, the movement path as valid, and registering map units passed in the movement path, to control the game object to move through the movement path; and
when there is a static obstruction object and a future dynamic obstruction object, sending, by the map server, a re-finding request to the path-finding server, and generating, by the pathfinding server, an updated path according to the re-finding request, and sending the updated path to the map server until the map server determines that there is no static obstruction object and no future dynamic obstruction object in the updated path.

Alternatively, step of receiving, by a game object, a movement request, and sending a movement starting point and movement ending point of the game object to a map server includes:
receiving, by the game object, a movement request;
sending, by the game object, the movement starting point and the movement ending point of the game object, and a movement path length threshold to a movement agent node;
sending, by the movement agent node, the movement starting point, the movement ending point, and the movement path length threshold to the map server;
step of packaging, by the map server, the received movement starting point and movement ending point, obstruction information and registered path to form map information, and sending the map information to a pathfinding server includes:
packaging, by the map server, the received movement starting point and movement ending point, the obstruction information, registered map units, and registration time of the registered map unit to form the map information, and sending the map information to the pathfinding server.

Alternatively, step of determining, by the map server, whether there is any static obstruction object and any future dynamic obstruction object in the movement path includes:
reading, by the map server, desired map units of the movement path, and comparing the desired map units with registered map units;
when at least one of the desired map units overlaps with at least one of the registered map units, determining, by the map server, that there is a static obstruction object and a future dynamic obstruction object in the movement path; and
when all of the desired map units do not overlap with all of the registered map units, determining, by the map server, that there is no static obstruction object and no future dynamic obstruction object in the movement path.

Alternatively, the registered map units comprises: registered static map units with constant registration time and/or registered dynamic map units with a registration starting time and a registration end time;

when at least one of the desired map units overlaps with at least one of the registered map units, and a desired registration period between a desired registration starting time and a desired registration end time of the desired map unit partially overlaps with a registered period between the registration starting time and the registration end time, the map server determines that there is a future dynamic obstruction object in the movement path; and when all of the desired map units do not overlap with all of the registered map units, or at least one of the desired map units overlaps with at least one of the registered map units, and a desired registration period between the desired registration starting time and the desired registration end time of the desired map unit does not partially overlap with the registered time period between the registration starting time and the registration end time, the map server determines that there is no future dynamic obstruction object in the movement path.

Alternatively, step of when there is no static obstruction object and future dynamic obstruction object, marking, by the map server, the movement path as valid, and registering map units passed in the movement path, to control the game object to move through the movement path includes:

when there is no static obstruction object and no future dynamic obstruction object, dividing, by the map server, the movement path into at least two path units, marking the path unit with the movement starting point as a starting point as valid, and registering map units in the valid path unit, to control the game object to move through the registered map units;

when the game object moves, sequentially determining, by the map server, whether there is a static obstruction object and a future dynamic obstruction object in an unmarked path unit;

when there is no static obstruction object and no future dynamic obstruction object in the unmarked path unit, sequentially marking, by the map server, the path unit as valid, and registering the map units in the valid path unit, to control the game object to move through the registered map units; and when there is a static obstruction object and a future dynamic obstruction object in the unmarked path unit, sending, by the map server, a re-finding request to the path-finding server, and generating, by the path-finding server, an updated path according to the re-finding request, and sending the updated path to the map server, until the map server determines that there is no static obstruction object and no future dynamic obstruction object in the updated path.

Alternatively, step of when there is a static obstruction object and a future dynamic obstruction object, sending, by the map server, a re-finding request to the path-finding server, and generating, by the pathfinding server, an updated path according to the re-finding request, and sending the updated path to the map server until the map server determines that there is no static obstruction object and no future dynamic obstruction object in the updated path includes:

when there is a static obstruction object and a future dynamic obstruction object, registering, by the map server, some map units of the movement path with the movement starting point as a starting point, and controlling the game object to move through the some map units, and at the same time, sending, by the map server, a re-finding request with a static obstruction object or a future dynamic obstruction object as an updated starting point to the path-finding server, and generating, by the pathfinding server, an updated path according to the re-finding request, and sending the updated path to the map server, until the map server determines that there is no static obstruction object and no future dynamic obstruction object in the updated path.

Alternatively, the map units are in a shape of a regular hexagon;

step of when there is a static obstruction object and a future dynamic obstruction object, sending, by the map server, a re-finding request to the path-finding server, and generating, by the pathfinding server, an updated path according to the re-finding request, and sending the updated path to the map server until the map server determines that there is no static obstruction object and no future dynamic obstruction object in the updated path includes:

when there is a static obstruction object and a future dynamic obstruction object, reading, by the map server, a side and an entry direction that the future dynamic obstruction object enters the map unit;

reading, by the map server, a desired side and a desired entry direction for entering the map unit in the movement path, and comparing the desired side and the desired entry direction with the side and the entry direction that the future dynamic obstruction object enters the map unit;

when the desired side is different from the side, and the desired entry direction is similar to the entry direction, marking, by the map server, the movement path as valid, and registering the map unit passed in the movement path, to control the game object to move through the movement path; and when the desired side is the same as the side, or the desired entry direction is opposite to the entry direction, sending, by the map server, a re-finding request to the path-finding server, and generating, by the path-finding server, an updated path according to the re-finding request, and sending the updated path to the map server until the map server determines that there is no static obstruction object and no future dynamic obstruction object in the updated path.

Alternatively, the step of when the desired side is different from the side, and the desired entry direction is similar to the entry direction, marking, by the map server, the movement path as valid, and registering the map units passed in the movement path, to control the game object to move through the movement path is replaced with:

when the desired side is different from the side, and the desired entry direction is similar to the entry direction, replacing, by the map server, the map units passed in the movement path with an adjacent side adjacent to the desired side, so that the movement path passes through a connecting side of two adjacent map units; and marking, by the map server, the movement path as valid, and registering the map units passed in the movement path, to control the game object to move through the movement path.

The present disclosure further discloses a device, comprising:

an interaction module configured to display game object, receive a movement request, and send out a movement starting point and a movement ending point of the game object;

a map server configured to receive the movement starting point and the movement ending point of the game object from the interaction module, and package the movement starting point, the movement ending point, obstruction information, and registered path to form map information;

a pathfinding server configured to receive the map information from the map server, generate a movement path, and return the movement path to the map server;

the map server determines whether there is any static obstruction object and any future dynamic obstruction object in the movement path;

when there is no static obstruction object and no future dynamic obstruction object, the map server marks the movement path as valid, and registers the map units passed in the movement path, to control the game object to move through the movement path;

when there is a static obstruction object and a future dynamic obstruction object, the map server sends a re-finding request to the path-finding server, and the path-finding server generates an updated path according to the re-finding request, and sends the updated path to the map server until the map server determines that there is no static obstruction object and no future dynamic obstruction object in the updated path.

The present disclosure further discloses a computer-readable storage medium on which a computer program is stored, where, when the computer program is executed by a processor, steps of the pathfinding method for a game object are implemented.

After adopting the technical solution, compared with the prior art, the beneficial effects are as follows:

More complicated movement and a pathfinding rule with a dynamic obstruction can be implemented in the game application program;

The technical solution can avoid various performance problems caused when the client and the server perform pathfinding operations at the same time, such as resource waste, and re-pathfinding;

Position-exclusive prediction is designed, and objects move in an optimal path without collision.

DETAILED DESCRIPTION

Figure 1:
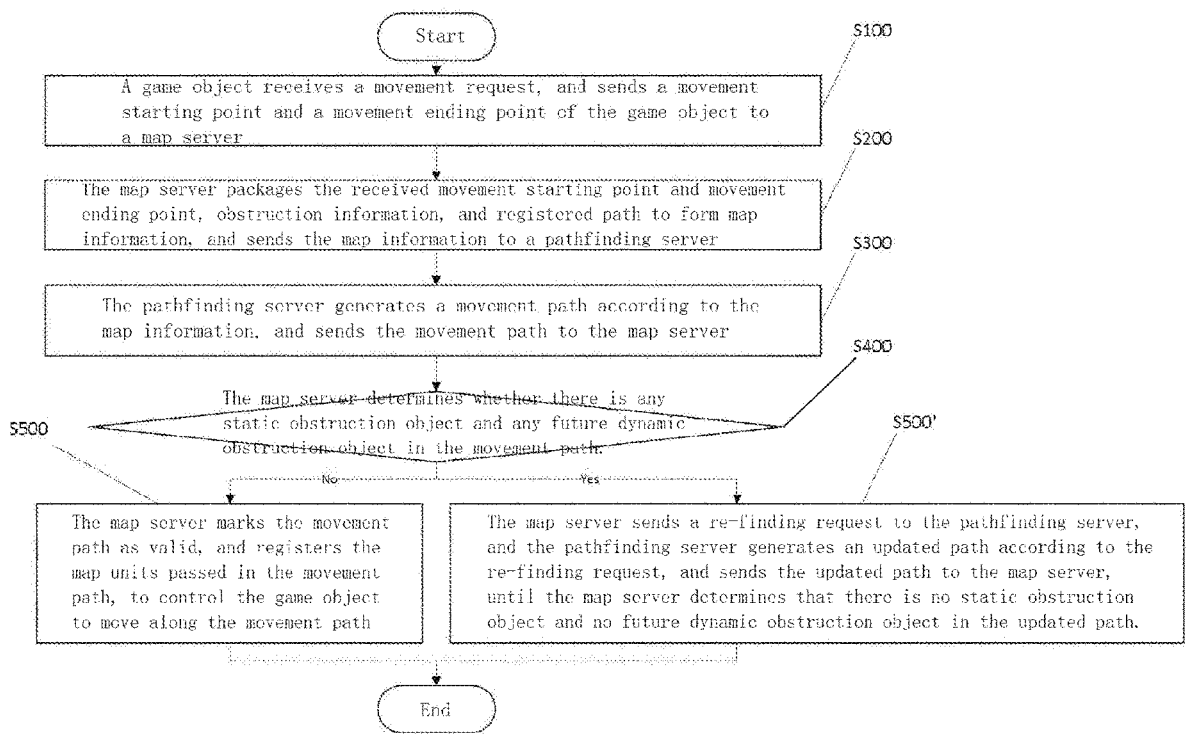
FIG. 1 is a schematic flowchart of a pathfinding method for a game object according to a preferred embodiment of the present disclosure.

Advantages of the present disclosure are further described below with reference to the drawings and specific embodiments.

The exemplary embodiments are described in detail herein, and examples thereof are shown in the accompanying drawings. When the following description involves the drawings, unless otherwise indicated, the same numbers in different drawings indicate the same or similar elements. The implementations described in the following exemplary embodiments do not represent all implementations consistent with the present disclosure. Rather, the implementations are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should further be understood that the term "and/or" as used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "while" or "in response to determining".

In the description of the present disclosure, it should be understood that the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, and are only for the convenience of describing the present disclosure and simplifying the description, and do not indicate or imply that the pointed device or element must have a specific orientation, or be constructed and operated in a specific orientation, and therefore cannot be understood as a limitation of the present disclosure.

In the description of the present disclosure, unless otherwise specified and limited, it should be noted that the terms "installed", "attached", and "connected" should be understood in a broad sense. For example, the connection can be a mechanical connection or an electrical connection, or may be internal communication between two elements, or may be a direct connection or an indirect connection through an intermediate medium. For the person of ordinary skill in the art, the specific meaning of the above terms can be understood according to specific conditions.

In the subsequent descriptions, a suffix such as "module", "component", or "unit" used to represent an element is merely used to facilitate description of the present disclosure, and does not have specific meanings. Therefore, "module" and "component" can be mixed for using.

Referring to FIG. 1, FIG. 1 is a schematic flowchart of a pathfinding method for a game object in accordance with a preferred embodiment of the present disclosure. In this embodiment, the pathfinding method for a game object includes the following steps:

S100: A game object receives a movement request, and sends a movement starting point and a movement ending point of the game object to a map server.

When a user uses a device such as a smartphone or a tablet to play a game, a game application program is activated, such as a chess game and a Moba game, to control the movement of a game object in the game according to the swipe operation of the user on the device. Specifically, the user moves the game object by clicking or dragging a game object to be moved, or rotating a cross wheel to control the movement of the game object on a display screen of the device, using a finger, a stylus or the like, or other device. An instruction input of the user to the device is regarded as a movement request by the device. Based on the movement request for the game object, a movement starting point of the game object (a current position, a position when the game object starts to move, etc.) and a movement ending point (a position where the game object stops after moving, a position where the game object suspends after moving, and a target position) are sent by the game application program to a map server.

The map server is peripheral to the device, and is configured such as a server used by the game application program developed by a game application grogram developer. Because the map server is isolated from the device, the pathfinding process for the game object is completed outside the device, and does not occupy device resources, so as to prevent the device from overheating and operation delay caused by the heavy occupation of the operation capability of the device.

S200: The map server packages the received movement starting point and movement ending point, obstruction information, and registered path to form map information, and sends the map information to a pathfinding server.

After the map server receives the movement starting point and the movement ending point sent by the device, the map server packages the movement starting point and the movement ending point, the obstruction information that is recorded in the map server and that is in a current map state for a current account in the game application program currently running on the device (for example, where in the map there are static obstructions, such as mountains, rivers, fixed or stable moving positions of NPC, etc.), and the registered path (the positions where the game objects controlled by other users are moving or going to move), to form map information. After the map information is formed by the map server, the map information will be sent to a pathfinding server connected to the map server (for example, one or more servers/server modules in communication connection with or being integrated in a server/server group).

S300: The pathfinding server generates a movement path according to the map information, and sends the movement path to the map server.

After receiving the map information, the pathfinding server generates a movement path according to the movement starting point and the movement ending point. Specifically, when the movement path is generated, the movement path is generated according to a generation logic, such as, the path is the shortest, and the known static obstruction object is bypassed. The movement path is returned to the map server by the pathfinding server.

It can be understood that, the pathfinding server may not store the map information in the game application program, and may only have processing operation logic for the map information. For example, based on two points of the movement starting point and the movement ending point, it is calculated that the shortest length of the path in the moveable paths between two points as the movement path, i.e. the shortest path as described above, or the path that bypasses the obstruction object and passes through the desired part of the path as specified by the game application program (e.g. shop, home base, etc.). The calculation logic can be freely determined by a maker of the game application program, or made according to requirements of the user.

S400: The map server determines whether there is any static obstruction object and any future dynamic obstruction object in the movement path.

After the map server receives the movement path, the movement path is a movement path based on the existing determined information. During the generating or the moving, there may be a change in the obstruction information in the map (newly added game object of another user). In this case, after receiving the movement path, the map server determines, at the current moment, that is, in the latest map information center, whether there is still a static obstruction object (for example, a static object newly generated on the map after the other user controls the game object to release the skill) and a future dynamic obstruction object (such as a new moving game object in the map) in the generated movement path. The determining method can be that the movement path is composed of multiple map units, and regardless of whether there is a static obstruction object or a dynamic obstruction object, the obstruction object would be located on a certain map unit. In this way, when there is a static obstruction object or a dynamic obstruction object in a certain map unit or some map units on the movement path, or when there are map units being registered or having been registered for other moving game objects, it is considered "there is", otherwise, it is considered "there is no".

It can be understood that performing of step S400 is not limited to be immediately after step S300. For example, step S400 may be performed during the movement of the game object, that is, after the map server receives the movement path, the moving object directly moves along the movement path. In the process of moving, at a certain point, it is determined whether there is a static obstruction object and a future dynamic obstruction object in the path that the game object has not moved to.

S500: When there is no static obstruction object and no future dynamic obstruction object, the map server marks the movement path as valid, and registers the map units passed in the movement path, to control the game object to move along the movement path.

When the determining result is "there is no", the movement path generated by the pathfinding server is a path along which the game object can move, so the map server marks the path as valid, and registers the map units in the movement path. When the game object starts to move or is in the process of moving, another game object is not allowed to enter the registered map units, that is, a registration mechanism provides an exclusive setting for the movement path to prevent the game object from colliding with other game object. After registration is performed for the movement path, the game object can start from the movement starting point and move along the movement path to the movement ending point. Until the movement ending point is reached, the movement ends and the registered map units are released to restore these map units to a non-exclusive re-registrable state.

S500': When there is a static obstruction object and a future dynamic obstruction object, the map server sends a re-finding request to the pathfinding server. The pathfinding server generates an updated path according to the re-finding request, and sends the updated path to the map server, until the map server determines that there is no static obstruction object and no future dynamic obstruction object in the updated path.

When the determining result is "there is", that is, if the game object moves along the movement path, the game object will hit the obstruction during the moving. In order to improve user experience and avoid occurrence of the above situation, the map server sends a re-finding request to the pathfinding server, and the pathfinding server generates an updated path after receiving the re-finding request. It can be understood that when the map server sends a re-finding request to the pathfinding server, the map server sends information of the static obstruction object and the future dynamic obstruction object (specifically, in which map unit or map units) in the verified movement path to the pathfinding server, so that the pathfinding server can bypass these map units when generating an updated path.

The above steps can be performed repeatedly, and the game object is controlled to move along a final updated path until the map server determines that there is no static obstruction object and no future dynamic obstruction object any longer in a certain updated path generated by the pathfinding server.

With the above configuration, on the one hand, a decoupling relationship between the movement path of the game object and the map units can be calculated in real time. On the other hand, by prediction of future movement, a calculation scene in which a large number of game objects are moving is implemented, and after this part of computing occupancy is transferred to the map server and the pathfinding server, resources and configuration of the device are saved.

In a preferred embodiment, step S100 includes the following steps:

S110: The game object receives a movement request.

An operation from the user on the device (that is, the device described above) is recognized by a capacitive screen of the device. After the user points to the game object in the game application program, the operation from the user is recognized as a user's desired movement manner for the game object, and is further recognized as a user's move request for the game object.

S120: The game object sends a movement starting point and a movement ending point of itself, and a movement path length threshold to a movement agent node.

After the user inputs the movement request, a current position of the game object or a map unit where the game object is located is used as the movement starting point. The movement starting point, a direction the user points to, and a specific value of the movement path length threshold preset by the device according to the game application program (the longest path the game object can move during a move) are sent to a movement agent node. In this embodiment, the movement agent node is an intermediary between the pathfinding server and the map server. On one hand, the movement agent node is used for data caching and forwarding, and on the other hand, the movement agent node is used for data processing and sorting, to prevent the pathfinding server from receiving too many processing requests and reducing a data processing speed.

S130: The movement agent node sends the movement starting point, the movement ending point, and the movement path length threshold to the map server.

After receiving the map information, the movement agent node forwards the map information to the map server. Buffering at the movement agent node allows all map information sent to the map server in an orderly manner, avoiding overloading the map server and slowing down processing.

Then, step S200 includes the following steps:

S210: The map server packages the received movement starting point and movement ending point, obstruction information, registered map units, and registration time of the registered map unit to form map information, and sends the map information to the pathfinding server.

After receiving the above map information, the map server packages other map information stored in the map server (such as map modeling information pre-stored by a game application program developer in its own map server, and information generated when other game objects moving on the map), the movement starting point, and the movement ending point, and sends them to the pathfinding server. The map information includes the registered map units and the registration time of the registered map units. The registered map units indicate which map units (for example, each cell in the grid map, or the location of the unit movement distance of the game object) in the map (or a seamed or seamless area) in which the game object is located have been registered when the user sends the movement request. The registered map units are locked by the registered game object, and other game objects cannot enter the registered map units, so that a collision does not occur. Considering that the game object is in a dynamic situation when moving, once the game object passes the registered map units, the game object does not move back again. Therefore, the registration time of each registered map unit, that is, the time when the game unit entering the registered map units and the time when the game unit leaving the registered map units, is also packaged to allow multiple game objects to move in the same map at the same time, while ensuring that no multiple game objects enter one map unit at the same time. In this way, the utilization of map units is increased, and the vacancy rate is reduced. On the one hand, the gaming process can be speeded up, and the user experience can be improved. On the other hand, the gameplay can be enriched, and the real-time performance of the game can be increased.

In a preferred or alternative embodiment, step S400 that the map server determines whether there is any static obstruction object and any future dynamic obstruction object in the movement path includes:

S410: The map server reads desired map units of the movement path, and compares the desired map units with the registered map units.

In order to determine whether there is any static obstruction object and any future dynamic obstruction object in the movement path, the map server first reads the desired map units in the movement path. The desired map units are map units involved in a pre-generated movement path of the game object to be moved this time. For example, if the movement starting point is a point A, the movement ending point is a point B, and the movement path from the point A to the point B passes through a point C, a point D and a point E, points A, B, C, D, E are the desired map units.

After calling the desired map units, the map server compares the desired map units with the registered map units to confirm whether the desired map units can be registered, to prevent multiple game objects from entering the same map unit at the same time.

S420: When at least one of the desired map units overlaps with at least one of the registered map units, the map server determines that there is a static obstruction object and a future dynamic obstruction object in the movement path.

When the comparison result in step S410 is that at least one of the desired map units overlaps with at least one of the registered map units, that is, the movement path of the game object intersects with other registered movement paths, it indicates that the game object and other game objects that are not moving (or are in the process of moving) pass the overlapped map unit, this indicates that there is a future dynamic obstruction objects in the movement path. It can be understood that, if other game objects stop or abort at the overlapped map unit, the other game objects are static obstruction objects in the movement path.

S420': When all of the desired map units do not overlap with all of the registered map units, the map server determines that there is no static obstruction object and no future dynamic obstruction object in the movement path.

Conversely, if all of the desired map units do not overlap with all of the registered map units, that is, the movement path of the game object does not intersect with other registered movement paths, there is no static obstruction object and no future dynamic obstruction object in the movement path of the game object, so that the movement path can be normally registered by the game object, and the game object can normally move along the movement path.

In the above embodiment, when the registered map units are compared with the desired map units, the included information specifically includes registered static map units with constant registration time and registered dynamic map units with registration starting time and registration end time. The registered static map units with constant registration time are static objects in the map that are preset by the game application program developer. Regardless of the game duration, these static objects are always located in the same map unit, and registration time of the static map units is constant. These map units are always in a registered state on a timeline. For the registered dynamic map unit, considering that the game object does not always occupy the registered dynamic map unit, thus, based on its dynamic state, the registration starting time when each game object entering the registered map unit and the registration end time when each game object leaving the registered map unit are recorded in the registered map unit.

It can be understood that a registration period between the registration starting time and the registration end time can be a regular time period in which the game object is not paused in the registered map unit, such as a registration period that is the time obtained by dividing a width of the map unit by a movement speed of the game object, or a period in which the game object stays in the registered map unit.

Based on this, when the desired map unit is compared with the registered map unit, if intersection occurs on the movement paths, a desired registration period between the desired registration starting time and the desired registration end time of the desired map unit is compared with a registered period between the registration starting time and the registration end time. The map server determines that there is a future dynamic obstruction object in the movement path only when the desired registration period partially overlaps with the registered period (that is, when multiple game objects enter the same map unit at a certain time). Differently, when all of the desired map units do not overlap with all of the registered map units, or at least one of the desired map units overlaps with at least one of the registered map units, and when the desired registration period between the desired registration starting time and the desired registration end time of the desired map unit does not partially overlap with the registered period between the registration starting time and the registration end time, it indicates that although a certain map unit or some map units are registered by multiple game objects at the same time, the times when multiple game objects enter the map unit are not repeated, and the multiple game objects enter and leave the map unit in a sequence. For the multiple game objects, no collision occurs. Therefore, the map server determines that there is no future dynamic obstruction object in the movement path.

Further, the step 500 of when there is no static obstruction object and no future dynamic obstruction object, the map server marks the movement path as valid, and registers the map units passed in the movement path, to control the game object to move through the movement path specifically includes:

S510: When there is no static obstruction object and no future dynamic obstruction object, the map server divides the movement path into at least two path units, marks the path unit with the moving starting point as the starting point as valid, and registers the map units in the valid path unit, to control the game object to move through the registered map units.

When it is determined that there is no static obstruction object and no future dynamic obstruction object in the movement path, in this embodiment, the map server divides the movement path into at least two path units, that is, the movement of the game object on the movement path is not completed at one time. On the contrary, the movement of the game unit on the movement path is determined for multiple times in a segmented manner to analyze the dynamic changes on the map in real time. More specifically, after division is determined, a first segment of path unit with the movement starting point as the starting point is marked as valid, and then the map units in the valid path unit are registered. That is, in the movement path, the rest path units other than this segment of path unit are in an open state of not being registered, and other game objects can enter the rest path units. Thereby, the game object moves on the registered map units.

S520: When the game object moves, the map server sequentially determines whether there is any static obstruction object and any future dynamic obstruction object in the unmarked path units.

When the game object moves, because the map units of the path unit have been registered, the game object can move freely. And at the same time, the map server sequentially determines whether there is any static obstruction objects and any future dynamic obstruction object in the unmarked path units. Generally speaking, when the game object moves in the previous segment of path unit, the map server determines whether the following segment of path unit can be registered for the game object to move, thereby reducing the single resource requirement of the map server.

S530: When there is no static obstruction object and no future dynamic obstruction object in the unmarked path units, the map server sequentially marks the path units as valid, and registers the map units in the valid path units, to control the game object to move through the registered map units.

When there is no static obstruction object and no future dynamic obstruction object in the following segment or multiple segments of unmarked path units, the map server sequentially marks the path units as valid, and registers the map units in the valid path units to control the game object to move through the registered map units, so that the game object can move sequentially within the successive map units.

S540: When there is a static obstruction object and a future dynamic obstruction object in the unmarked path units, the map server sends a re-finding request to the path-finding server. The path-finding server generates an updated path according to the re-finding request, and sends the updated path to the map server until the map server determines that there is no static obstruction object and no future dynamic obstruction object in the updated path.

If other game objects with higher priority need to preferably enter some map units during the movement of the game object due to dynamic changes of other game objects in the map, a case occur in which there is a static obstruction object and a future dynamic obstruction object in the unmarked path units. Therefore, the map server sends a re-finding request to the pathfinding server. That is, a subsequent movement path is re-determined during the movement of the game object. That is, the pathfinding server generates, based on the re-finding request, an updated path different from the original movement path by using the ending point of the registered path unit as an updated movement starting point, and sends the updated path to the map server. The map server determines again whether there is a static obstruction object and a future dynamic obstruction object in the updated path. It can be understood that the overall determining rule or the segmented determining rule can be used when the map server performs determining this time or each subsequent time. The overall determining rule is to determine whether the overall updated path is valid, and the segmented determining rule is to sequentially determine whether each segment or multiple segments is/are valid in the updated path. The specific method can be determined according to the computing power of the server for the user and the number of game objects on the map. The above determining is performed until there is no static obstruction object and no future dynamic obstruction object any longer in the updated path. Most preferably, it can be determined every time the game object moves through a path unit until the segmented valid path is continuously updated.

In a preferred embodiment, the step 600 of when there is a static obstruction object and a future dynamic obstruction object, the map server sends a re-finding request to the path-finding server, and the path-finding server generates an updated path according to the re-finding request, and sends the updated path to the map server until the map server determines that there is no static obstruction object and no future dynamic obstruction object in the updated path specifically includes:

S610: When there is a static obstruction object and a future dynamic obstruction object, it is different from the situation where the game object needs to wait for a valid movement path to appear, that is, even if it is known that there is an obstruction state on the movement path, the game object still starts to move (then for the user, the operation delay is greatly reduced). Then, on the map server side, the map server registers some map units of the movement path with the movement starting point as the starting point, and controls the game object to move through the some map units. At the same time, the map server sends, to the pathfinding server, a re-finding request with a static obstruction object or a future dynamic obstruction object as the updated starting point. The path-finding server generates an updated path according to the re-finding request, and sends the updated path to the map server until the map server determines that there is no static obstruction object and no future dynamic obstruction object in the updated path. That is, because the obstruction usually occurs in the middle of the movement path, the game object can move normally in the previous segment of the movement path. Therefore, in order to speed up the processing speed, the map server sends the pathfinding request to the pathfinding server during the movement of the game object. Multiple steps are operated in parallel. Thus, for the users of the game application program, movement requests from users will be responded to more quickly, improving the user experience.

It can be understood that, if n path points after the movement starting point cannot be registered during the initial movement, it is regarded as a move failure, and the pathfinding is performed again. When the moving object moves to a certain target point (a non-movement ending point), if there is an obstruction at the target point, it can be configured to return to the previous target point and path-finding is performed again.

In another preferred embodiment, each map unit is configured to be a regular hexagon, and the game object can enter from any side of the regular hexagon and leave from any side of the regular hexagon. It can be understood that, if the side that the game object enters and the side that the game object leaves are not opposite sides, the game object provides the user with turning interaction within the map unit. Further, step S600 specifically includes:

S610': When there is a static obstruction object and a future dynamic obstruction object, the map server reads a side and an entry direction that the future dynamic obstruction object enters the map unit.

After determining that there is a static obstruction object and a future dynamic obstruction object in the movement path, the map server reads specific obstruction information of the future dynamic obstruction object, such as which side and entry direction that the future dynamic obstruction object enters the map unit, that is, how the future dynamic obstruction object specifically enters the map unit.

S620': The map server reads a desired side and a desired entry direction for entering the map unit in the movement path, and compares the desired side and the desired entry direction with the side and entry direction that the future dynamic obstruction object enters the map unit.

Similarly, for the map unit in the movement path that may collide with the future dynamic obstruction object, the map server reads the desired side and the desired entry direction that the game object enters the same map unit. After obtaining the desired side and the desired entry direction, the desired side and the desired entry direction are compared with the side and the entry direction that the future dynamic obstruction object enters the map unit. It can be understood that, in this embodiment, multiple game objects are allowed to enter the same map unit at the same time, provided that the sides that these game objects enter or leave are inconsistent with each other. That is, for the user, the game objects and other game objects enter and leave from different sides of the map unit. There is no obvious collision interaction even when the model of the game object is small. Therefore, in some scenarios provided in the embodiment (multiple melee game objects confront each other and game objects need to be in contact), applications with collisions or approximate collisions can be reduced, so that the applicability of this embodiment of the present disclosure in different game application is improved.

S630': When the desired side is different from the side, and the desired entry direction is similar to the entry direction, the map server marks the movement path as valid, and registers the map units passed in the movement path, so as to control the game object to move through the movement path.

When the result of the comparison is that the desired side is different from the side, and the desired entry direction is similar to the entry direction, the game object and other game objects are allowed to move together in the same map unit. Therefore, the map server marks the movement path as valid, and performs registration in the map unit, so that the map unit is registered for multiple times/repeatedly at the same time (repeated registration is open in this embodiment), and finally controls the game object to move within the movement path.

S640': When the desired side is the same as the side, or the desired entry direction is opposite to the entry direction, the map server sends a re-finding request to the path-finding server, and the path-finding server generates an updated path according to the re-finding request, and sends the updated path to the map server until the map server determines that there is no static obstruction object and no future dynamic obstruction object in the updated path.

Conversely, when the desired side is the same as the side, or the desired entry direction is opposite to the entry direction, it indicates that the game object and other game objects enter or leave the map unit at the same place. Even under the open permission that the map unit is allowed to be repeatedly registered, there is a case in which multiple game objects fully collide. Therefore, the map server sends a re-finding request to the path-finding server, and the path-finding server generates an updated path according to the re-finding request, and sends the updated path to the map server until the map server determines that there is no static obstruction object and no future dynamic obstruction object in the updated path.

Further, step S630' can be replaced with:

S631": When the desired side is different from the side, and the desired entry direction is similar to the entry direction, the map server replaces the map unit passed in the movement path with an adjacent side adjacent to the desired side, so that the movement path passes a connecting side between two adjacent map units.

Similarly, when the desired side is different from the side, and the desired entry direction is similar to the entry direction, one of the game object and the remaining game objects are controlled to move completely within the map unit, while the other moves through the connection of the adjacent map units. Specifically, the map server replaces the map unit passed in the movement path with an adjacent side adjacent to the desired side, that is, the movement path does not completely pass through a certain map unit, but passes through the connecting side of two adjacent map units. This configuration can further utilize the space in the map. For game development, the difficulty of map development and the size of the map can be reduced, so that research and development resources are saved.

S632": The map server marks the movement path as valid, and registers the map units passed in the movement path, so as to control the game object to move through the movement path.

Then, the map server marks the movement path as still valid, and also registers the map units passed in the movement path. However, when moving to the above desired map unit, the game object does not enter the desired map unit, and the moving object is controlled to pass through the connecting side. Preferably, when the game object moves, a case may occur that for two adjacent map units, there are two game objects located at or moving through these two map units at the same time, and a third game object can move on the connecting side of the two map units. That is, at the same time, the three game objects only occupy two map units and move without hindrance under the basically collision-free interactive representation, so that the difficulty of map development is further reduced.

Figure 2:
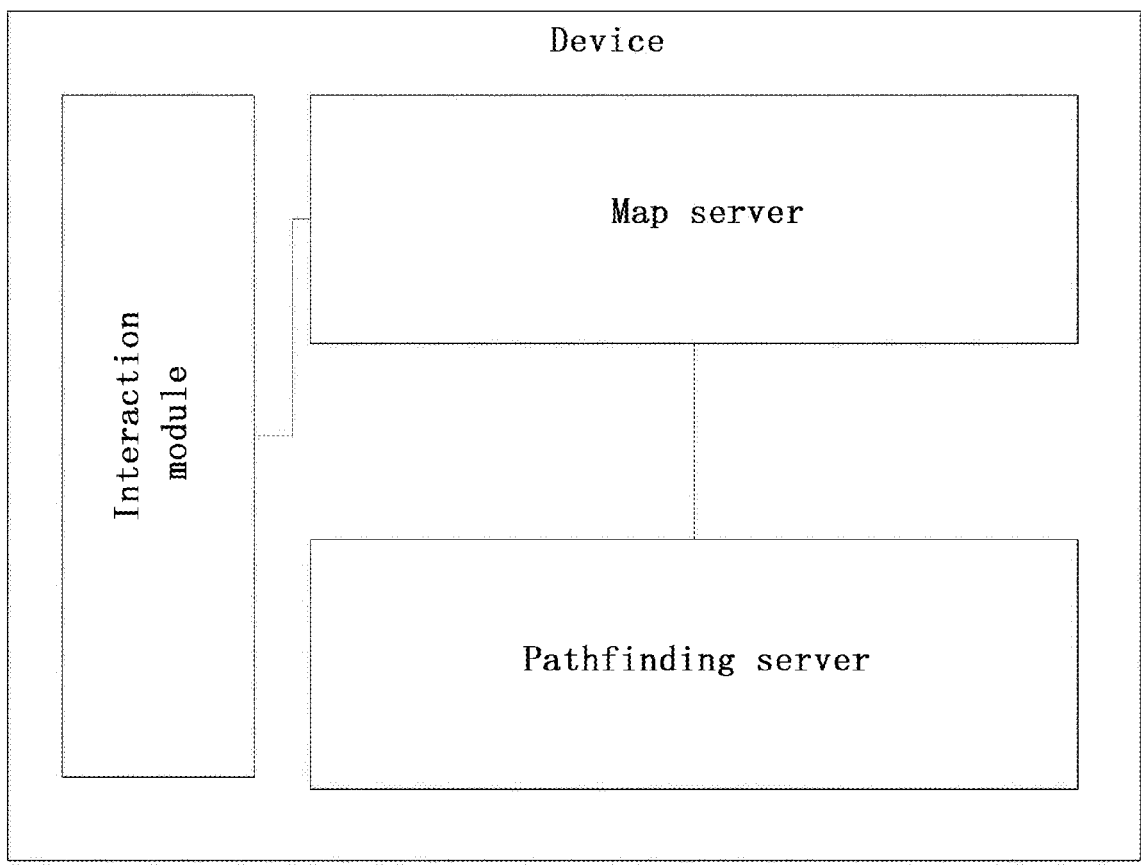
FIG. 2 is a schematic structural diagram of a device according to a preferred embodiment of the present disclosure.

Referring to FIG. 2, the present disclosure has disclosed a device, such as a terminal and a server group for pathfinding for a game object, including:

an interaction module that displays a game object, receives a movement request, and sends out a movement starting point and a movement ending point of the game object;

a map server that receives the movement starting point and the movement ending point of the game object from the interaction module, and packages the movement starting point, the movement ending point, obstruction information, and registered path to form map information;

a pathfinding server that receives the map information from the map server, generates a movement path, and returns the movement path to the map server;

the map server determines whether there is any static obstruction object and any future dynamic obstruction object in the movement path;

when there is no static obstruction object and no future dynamic obstruction object, the map server marks the movement path as valid, and registers map units passed in the movement path, to control the game object to move through the movement path;

when there is a static obstruction object and a future dynamic obstruction object, the map server sends a re-finding request to the path-finding server, and the path-finding server generates an updated path according to the re-finding request, and sends the updated path to the map server until the map server determines that there is no static obstruction object and no future dynamic obstruction object in the updated path.

The present disclosure further discloses a computer-readable storage medium on which a computer program is stored. When the computer program is executed by a processor, the steps of the pathfinding method for a game object are implemented.

It should be noted that the embodiments of the present disclosure have better implementations and do not limit the present disclosure in any form. Any person skilled in the art may use the technical content disclosed above to change or modify equivalent effective embodiments. However, any modifications or equivalent changes and modifications made to the above embodiments based on the technical essence of the present disclosure without departing from the content of the technical solution of the present disclosure still fall within the scope of the technical solution of the present disclosure.

What is claimed is:

1. A pathfinding method for a game object, comprising the following steps:
   receiving, by a game object, a movement request, and sending a movement starting point and a movement ending point of the game object to a map server;
   packaging, by the map server, the received movement starting point and movement ending point, obstruction information, and registered path to form map information, and sending the map information to a pathfinding server;
   generating, by the pathfinding server, a movement path according to the map information, and sending the movement path to the map server;
   determining, by the map server, whether there is any static obstruction object and any future dynamic obstruction object in the movement path;
   when there is no static obstruction object and future dynamic obstruction object, marking, by the map server, the movement path as valid, and registering map units passed in the movement path, to control the game object to move through the movement path; and
   when there is the static obstruction object and the future dynamic obstruction object, sending, by the map server, a re-finding request to the path-finding server, and generating, by the pathfinding server, an updated path according to the re-finding request, and sending the updated path to the map server, until the map server determines that there is no static obstruction object and no future dynamic obstruction object in the updated path.

2. The pathfinding method for a game object according to claim 1, wherein, step of receiving, by a game object, a movement request, and sending a movement starting point and a movement ending point of the game object to a map server comprises:
  receiving, by the game object, a movement request;
  sending, by the game object, the movement starting point and the movement ending point of the game object, and a movement path length threshold to a movement agent node;
  sending, by the movement agent node, the movement starting point, the movement ending point, and the movement path length threshold to the map server;
step of packaging, by the map server, the received movement starting point and movement ending point, obstruction information and registered path to form map information, and sending the map information to a pathfinding server comprises:
  packaging, by the map server, the received movement starting point and movement ending point, the obstruction information, registered map units, and registration time of the registered map units to form the map information, and sending the map information to the pathfinding server.

3. The pathfinding method for a game object according to claim 1, wherein,
  step of determining, by the map server, whether there is any static obstruction object and any future dynamic obstruction object in the movement path comprises:
  reading, by the map server, desired map units of the movement path, and comparing the desired map units with registered map units;
  when at least one of the desired map units overlaps with at least one of the registered map units, determining, by the map server, that there is a static obstruction object and a future dynamic obstruction object in the movement path; and
  when all of the desired map units do not overlap with all of the registered map units, determining, by the map server, that there is no static obstruction object and no future dynamic obstruction object in the movement path.

4. The pathfinding method for a game object according to claim 3, wherein,
  the registered map units comprise: registered static map units with constant registration time and/or registered dynamic map units with a registration starting time and a registration end time;
  when at least one of the desired map units overlaps with at least one of the registered map units, and a desired registration period between a desired registration starting time and a desired registration end time of the desired map unit partially overlaps with a registered period between the registration starting time and the registration end time, the map server determines that there is a future dynamic obstruction object in the movement path; and
  when all of the desired map units do not overlap with all of the registered map units, or at least one of the desired map units overlaps with at least one of the registered map units, and a desired registration period between the desired registration starting time and the desired registration end time of the desired map unit does not partially overlap with the registered time period between the registration starting time and the registration end time, the map server determines that there is no future dynamic obstruction object in the movement path.

5. The pathfinding method for a game object according to claim 4, wherein,
  step of when there is no static obstruction object and future dynamic obstruction object, marking, by the map server, the movement path as valid, and registering map units passed in the movement path, to control the game object to move through the movement path comprises:
  when there is no static obstruction object and no future dynamic obstruction object, dividing, by the map server, the movement path into at least two path units, marking the path unit with the movement starting point as a starting point as valid, and registering map units in the valid path unit, to control the game object to move through the registered map units;
  when the game object moves, sequentially determining, by the map server, whether there is a static obstruction object and a future dynamic obstruction object in an unmarked path unit;
  when there is no static obstruction object and no future dynamic obstruction object in the unmarked path unit, sequentially marking, by the map server, the path unit as valid, and registering the map units in the valid path unit, to control the game object to move through the registered map units; and
  when there is a static obstruction object and a future dynamic obstruction object in the unmarked path unit, sending, by the map server, a re-finding request to the path-finding server, and generating, by the path-finding server, an updated path according to the re-finding request, and sending the updated path to the map server, until the map server determines that there is no static obstruction object and no future dynamic obstruction object in the updated path.

6. The pathfinding method for a game object according to claim 1, wherein,
  step of when there is a static obstruction object and a future dynamic obstruction object, sending, by the map server, a re-finding request to the path-finding server, and generating, by the pathfinding server, an updated path according to the re-finding request, and sending the updated path to the map server, until the map server determines that there is no static obstruction object and no future dynamic obstruction object in the updated path comprises:
  when there is a static obstruction object and a future dynamic obstruction object, registering, by the map server, some map units of the movement path with the movement starting point as a starting point, and controlling the game object to move through the some map units, and at the same time, sending, by the map server, a re-finding request with a static obstruction object or a future dynamic obstruction object as an updated starting point to the path-finding server, and generating, by the pathfinding server, an updated path according to the re-finding request, and sending the updated path to the map server, until the map server determines that there is no static obstruction object and no future dynamic obstruction object in the updated path.

7. The pathfinding method for a game object according to claim 1, wherein,
  the map units are in a shape of a regular hexagon;
  step of when there is a static obstruction object and a future dynamic obstruction object, sending, by the map server, a re-finding request to the path-finding server, and generating, by the pathfinding server, an updated path according to the re-finding request, and sending the updated path to the map server, until the map server determines that there is no static obstruction object and no future dynamic obstruction object in the updated path comprises:

when there is a static obstruction object and a future dynamic obstruction object, reading, by the map server, a side and an entry direction that the future dynamic obstruction object enters the map unit;

reading, by the map server, a desired side and a desired entry direction for entering the map unit in the movement path, and comparing the desired side and the desired entry direction with the side and the entry direction that the future dynamic obstruction object enters the map unit;

when the desired side is different from the side, and the desired entry direction is similar to the entry direction, marking, by the map server, the movement path as valid, and registering the map unit passed in the movement path, to control the game object to move through the movement path; and when the desired side is the same as the side, or the desired entry direction is opposite to the entry direction, sending, by the map server, a re-finding request to the path-finding server, and generating, by the path-finding server, an updated path according to the re-finding request, and sending the updated path to the map server, until the map server determines that there is no static obstruction object and no future dynamic obstruction object in the updated path.

8. The pathfinding method for a game object according to claim 7, wherein, step of when the desired side is different from the side, and the desired entry direction is similar to the entry direction, marking, by the map server, the movement path as valid, and registering the map units passed in the movement path, to control the game object to move through the movement path is replaced with:

when the desired side is different from the side, and the desired entry direction is similar to the entry direction, replacing, by the map server, the map units passed in the movement path with an adjacent side adjacent to the desired side, so that the movement path passes through a connecting side of two adjacent map units; and marking, by the map server, the movement path as valid, and registering the map units passed in the movement path, to control the game object to move through the movement path.

9. A device, comprising:

an interaction module configured to display game object, receive a movement request, and send out a movement starting point and a movement ending point of the game object;

a map server configured to receive the movement starting point and the movement ending point of the game object from the interaction module, and package the movement starting point, the movement ending point, obstruction information, and registered path to form map information;

a pathfinding server configured to receive the map information from the map server, generate a movement path, and return the movement path to the map server;

the map server determines whether there is any static obstruction object and any future dynamic obstruction object in the movement path;

when there is no static obstruction object and no future dynamic obstruction object, the map server marks the movement path as valid, and registers the map units passed in the movement path, to control the game object to move through the movement path;

when there is a static obstruction object and a future dynamic obstruction object, the map server sends a re-finding request to the path-finding server, and the path-finding server generates an updated path according to the re-finding request, and sends the updated path to the map server, until the map server determines that there is no static obstruction object and no future dynamic obstruction object in the updated path.

10. A computer-readable storage medium on which a computer program is stored, wherein, when the computer program is executed by a processor, steps of the pathfinding method for a game object according to claim 1 are implemented.

* * * * *